United States Patent [19]

Milheiser

[11] Patent Number: 4,730,188

[45] Date of Patent: Mar. 8, 1988

[54] IDENTIFICATION SYSTEM

[75] Inventor: Thomas A. Milheiser, Littleton, Colo.

[73] Assignee: Identification Devices, Inc., Boulder, Colo.

[21] Appl. No.: 814,492

[22] Filed: Dec. 30, 1985

Related U.S. Application Data

[63] Continuation of Ser. No. 580,401, Feb. 15, 1984, abandoned.

[51] Int. Cl.⁴ .............................................. H04Q 1/00
[52] U.S. Cl. ............................ 340/825.0; 340/825.69; 340/825.72
[58] Field of Search ............... 375/88, 45, 62; 370/53; 455/118; 343/6.5 R, 6.5 LC, 6.8 LC; 340/825.54, 825.0, 825.55, 825.69, 825.72, 825.34, 825.94, 572

[56] References Cited

U.S. PATENT DOCUMENTS

| | | |
|---|---|---|
| 3,022,492 | 2/1962 | Kleist et al. . |
| 3,128,744 | 4/1964 | Jefferts et al. . |
| 3,137,847 | 6/1964 | Kleist . |
| 3,144,017 | 8/1964 | Muth . |
| 3,299,424 | 1/1967 | Vinding . |
| 3,313,301 | 4/1967 | Jefferts et al. . |
| 3,369,525 | 2/1968 | Debrotnic et al. . |
| 3,427,614 | 2/1969 | Vinding . |
| 3,440,633 | 4/1969 | Vinding . |
| 3,541,995 | 11/1970 | Fathauer . |
| 3,545,405 | 12/1970 | Jefferts . |
| 3,557,758 | 1/1971 | Lack . |
| 3,689,885 | 9/1972 | Kaplan et al. . |
| 3,739,279 | 6/1973 | Hollis . |
| 3,752,960 | 8/1973 | Walton . |
| 3,757,035 | 9/1973 | Sullivan . |
| 3,803,571 | 4/1974 | Luz . |
| 3,816,709 | 6/1974 | Walton . |
| 3,820,545 | 6/1974 | Jefferts . |
| 3,859,624 | 1/1975 | Kriofsky et al. . |
| 3,878,322 | 4/1975 | Sullivan . |
| 3,890,581 | 6/1975 | Stuart et al. . |
| 3,898,619 | 8/1975 | Carsten et al. . |
| 3,933,612 | 1/1976 | Fischer et al. . |
| 3,944,928 | 3/1976 | Augenblick et al. . |
| 3,964,024 | 6/1976 | Hutton et al. . |
| 4,040,053 | 8/1977 | Olsson . |
| 4,053,836 | 10/1977 | Fellrath ............................ 375/88 X |
| 4,065,753 | 12/1977 | Paul, Jr. . |
| 4,068,232 | 1/1978 | Meyers et al. . |
| 4,075,632 | 2/1978 | Baldwin et al. . |
| 4,079,414 | 3/1978 | Sullivan . |
| 4,087,791 | 5/1978 | Lemberger . |
| 4,114,151 | 9/1978 | Denne et al. . |
| 4,129,855 | 12/1978 | Rodrian . |
| 4,187,509 | 2/1980 | Weiner . |
| 4,196,418 | 4/1980 | Kip et al. . |
| 4,209,783 | 6/1980 | Ohyama et al. . |
| 4,233,964 | 11/1980 | Jefferts et al. . |
| 4,242,663 | 12/1980 | Slobodin . |

(List continued on next page.)

FOREIGN PATENT DOCUMENTS 2919753 11/1980 Fed. Rep. of Germany .

OTHER PUBLICATIONS

Ray Ryan, "Basic Digital Electronics", Tab Books, Blue Ridge Summit, Pa., 1975, pp. 28-31, 52-55.
IBM Technical Disclosure Bulletin, vol. 20, No. 7. (Dec. 1977).

Primary Examiner—Ulysses Weldon
Attorney, Agent, or Firm—Saidman, Sterne, Kessler & Goldstein

[57] ABSTRACT

A passive integrated transponder (PIT) is attached to or embedded in an item to be identified. It is excited via an inductive coupling from an interrogator. The PIT responds to the interrogator via the inductive coupling with a signal constituting a stream of data unique to the identified item. The signal is in the form of two different frequencies, a shift from one frequency to the second during a bit cell representing a data "one", and a shift from the second frequency to the first frequency representing a data "zero". The responsive signal is then detected and processed for utilization in a data storage or display device.

39 Claims, 8 Drawing Figures

U.S. PATENT DOCUMENTS

| | | |
|---|---|---|
| 4,262,632 | 4/1981 | Hanton et al. . |
| 4,313,033 | 1/1982 | Walker et al. . |
| 4,333,072 | 6/1982 | Beigel . |
| 4,345,253 | 8/1982 | Hoover . |
| 4,350,883 | 9/1982 | Lagarde . |
| 4,368,439 | 1/1983 | Shibuya et al. . |
| 4,388,524 | 6/1983 | Walton . |
| 4,447,909 | 5/1984 | Hjorring ............................. 375/88 |
| 4,463,353 | 7/1984 | Kuzara . |
| 4,485,347 | 11/1984 | Hirasawa et al. ................. 375/88 X |
| 4,494,553 | 1/1985 | Sciarra et al. . |
| 4,510,495 | 4/1985 | Sigrimis et al. . |
| 4,517,563 | 5/1985 | Diamant . |
| 4,525,713 | 6/1985 | Barletta et al. . |
| 4,556,883 | 12/1985 | Strietzel . |
| 4,596,985 | 6/1986 | Bongard et al. . |
| 4,602,253 | 7/1986 | Kreft . |
| 4,630,044 | 12/1986 | Polzer . |

IDENTIFICATION SYSTEM

This is a continuation of application Ser. No. 580,401, filed Feb. 15, 1984, now abandoned.

BACKGROUND AND OBJECTS OF THE INVENTION

The primary object of this invention is to provide a system for identifying an object, animal or person consisting essentially of two units, one being a passive integrated transponder (PIT) which is carried by or embedded in the thing or animal to be identified and which responds to interrogation with an identifying code, and the other unit being an interrogator-reader separate from the PIT.

Heretofore, in identification device systems, there is usually found some sort of an exciter which is associated with an interrogator which feeds a combined alternating current clock signal and power supply signal to a responder device via an inductive coupling. The responder may be implanted in an animal or on something whose identity is to be ascertained, such as a freight car. The responder produces a coded identification signal which is fed back through the inductive coupling to a detector and demodulator which produces an output signal characteristic of the particular animal or thing that is being identified.

Many coded data transmission systems have been used. In some the responder entails a resonant circuit the resonant frequency of which varies according to the encoded signal peculiar to the animal or thing being identified. In Kaplan et al. U.S. Pat. No. 3,689,885, coded information was returned from a responder to an interrogator in the form of spaced bursts of alternating current of a fixed frequency. In Beigel U.S. Pat. No. 4,333,072, for example, the responder or tag circuit produces a signal by varying the load across the inductor responsive to the encoded signal characteristic of the animal or thing being identified. All of these systems were subject to certain drawbacks: the resonant circuit systems particularly being subject to variations in resonance frequency produced by, for example, changes in temperature which, in some instances, could produce spurious variations in frequency which were difficult if not impossible to differentiate from variations produced by the encoding device. Systems wherein the code signal was represented by variations in amplitude of an oscillating circuit have the drawback that such variations in amplitude are difficult to accurately detect.

SUMMARY OF THE INVENTION

As in the cases of most of its predecessor systems, the subject transponder is supplied with a combined clock and power signal from an interrogating unit by way of inductively coupling and is implanted on the thing to be identified and detected. The transponder produces an encoded signal which is fed back through the inductive coupling to the interrogating unit, but in a different form than that incorporated in the predecessor devices. According to the invention, the clock signal derived via the inductive coupling from the interrogating unit is reduced in frequency and then caused to shift in frequency. In particular an incoming clock signal of 400 KHz is fed to a variable modulus counter followed by a divide-by-two circuit which together, in one state, divide the clock signal by eight and, in another state, divide the clock signal by ten. Thus, the output of the variable modulus counter produces an alternating current signal of either 40 KHz or 50 KHz, a shift from a first one of which frequencies to the second, generally stated, is representative of a "zero" while the opposite shift is representative of a "one". The "ones" or "zeros" are produced by the encoding device, and are returned to the interrogating device via the inductive coupling and detected. It is an easy task for the interrogator-detector to recognize a shift from a 40 KHz signal to a 50 KHz signal and vice-versa.

The foregoing represents a simplification of the encoding system. In practice, an array of logic gates is used to control the insertion of a sync word in the datastream. This logic also creates a Manchester encoding on the datastream. The result is a serial composite signal including sync and data information.

The composite stream controls the modulus (divide ratio) of the variable modulus counter which is clocked by the input clock (400 kHz). The output of the variable modulus counter is either 80 khz or 100 khz, depending on the data value. This counter drives a divide-by-two flip flop which results in output frequencies of 40 KHz or 50 KHz which vary as a function of the data.

More specific objects will be apparent from the following specification and drawings in which:

FIG. 1 is a block diagram of the overall system;
FIG. 2 is a circuit diagram of the exciter;
FIG. 3 is a circuit diagram of the signal conditioner;
FIG. 4 is a circuit diagram of the passive integrated transponder (PIT);
FIG. 5 is a timing diagram showing the transmitted message;
FIG. 6 is a circuit diagram of the demodulator; and,
FIGS. 7 and 7A are a diagram of the control logic and encoding circuit.

DESCRIPTION OF THE PREFERRED EMBODIMENTS

Overall Operation

Figure 1:
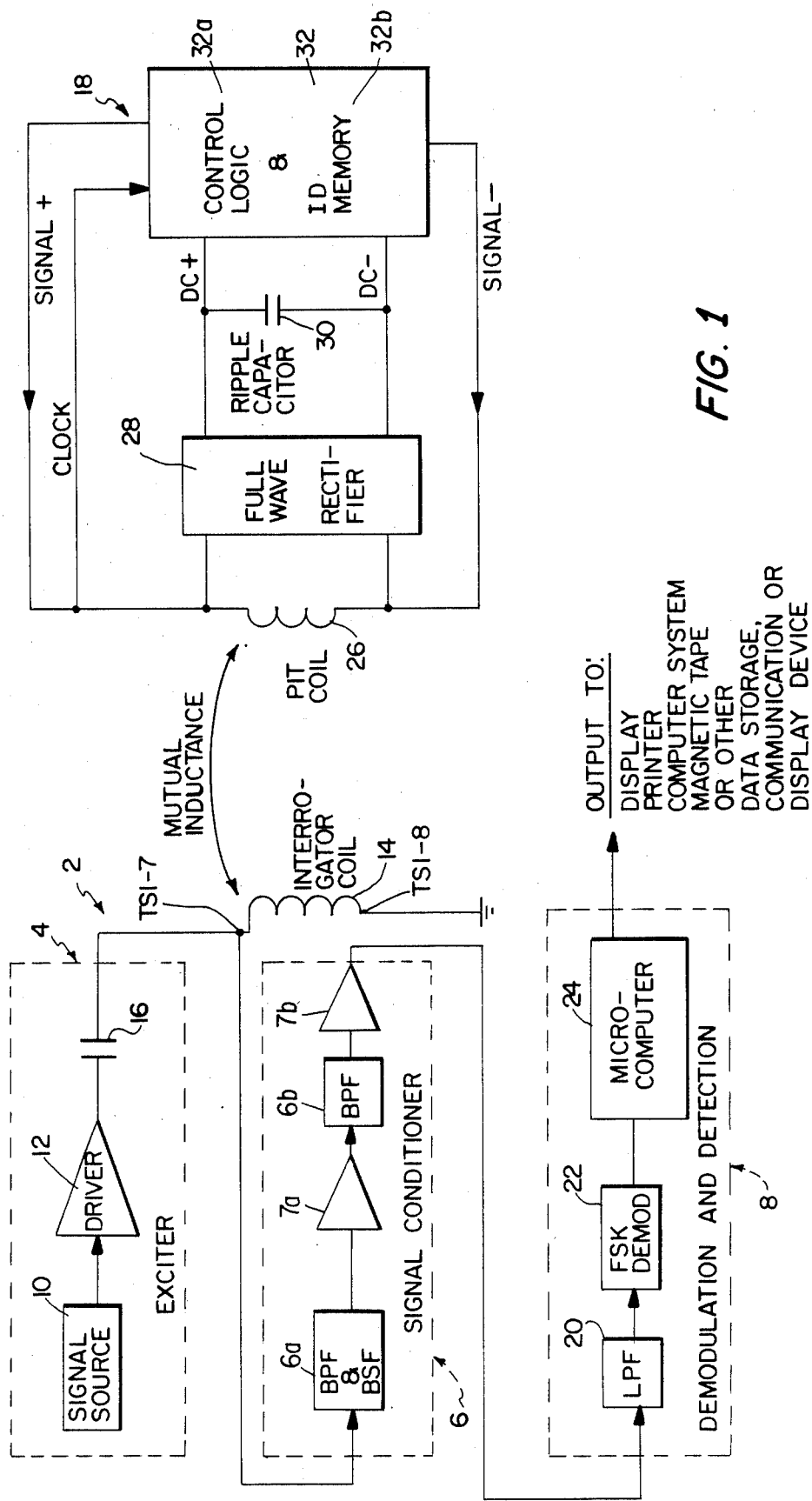

FIG. 1 shows the overall system consisting of a reader/exciter 2 and the passive integrated transponder (PIT) 18.

The reader/exciter unit 2 includes three main functional units: The exicter 4, signal conditioner 6 and the demodulation and detection circuits 8. The exciter 4 consists of an AC signal source 10, followed by a power driver 12 which provides a high current, high voltage excitation signal to the interrogator coil 14 through a capacitor 16. The interrogator coil 14 and the capacitor 16 are selected to resonate at the excitation signal frequency so that the voltage across the coil is much greater than the voltage output from the driver.

The signal conditioner 6 connects to the interrogator coil 14 and serves to amplify the identification signal returned from the PIT 18 while filtering out the excitation signal frequency as well as other noise and undesired signals outside of the frequency range used by the PIT signals.

The amplified output of the signal conditioner 6 is fed to the demodulation and detection unit 8 which includes a low pass filter 20 to further reduce excitation signal energy, a frequency shift keyed (FSK) demodulator 22 and a microcomputer 24. The FSK demodulator 22 is a phase-locked loop circuit configured as a tone decoder which gives a digital output as the signal from the PIT 18 shifts between two frequencies. The microcomputer 24 extracts the identification code from this digital output by observing the timing of transitions between the two logic levels. The identification code obtained by the microcomputer 24 can be transferred to a display or printer, sent over communication lines to a remote point, stored on tape, disk or other storage medium, or sent to another computer.

The PIT 18 consists of an induction coil 26 which is located such that the magnetic flux generated by the interrogator coil 14 couples energy at the exciter frequency into the PIT. This energy is converted to a DC voltage using a full-wave rectifier bridge 28 and a smoothing capacitor 30 as is commonly used in power supply circuits. This DC voltage supplies the power to the control logic and ID memory circuit 32.

The control logic 32a consists of counters and gates which sequentially read out the contents of the ID memory 32b. The logic 32a also inserts a sync word into the signal data stream to allow the reader/exciter to synchronize to the data. The excitation signal which appears on the PIT coil 26 is supplied to the control logic to provide a clock signal. The logic circuit 32a convert the serial data and sync stream into a frequency shift keyed (FSK) waveform which is connected to the PIT coil 26 through complementary current sinks to transmit the FSK identification signal. The transmitted signal is received by the interrogator coil 14 due to the mutual inductance and is amplified by the signal conditioner and detected.

In the following detailed description of the system, the components of the interrogator 2, e.g., the exciter 4, the signal conditioner 6, etc., are different units which are connected to one another through a standard connection TSI (FIG. 2) as indicated. It should be understood, however, that they may all be wired together.

In the following description of the circuits, the reference numeral prefix denotes the drawing figure in which the designated element resides. Thus, "2Cl" or "2Ll" means that "Cl" and "L1" are in the circuit shown in FIG. 2.

DETAILED DESCRIPTION

Exciter 4

Figure 2:
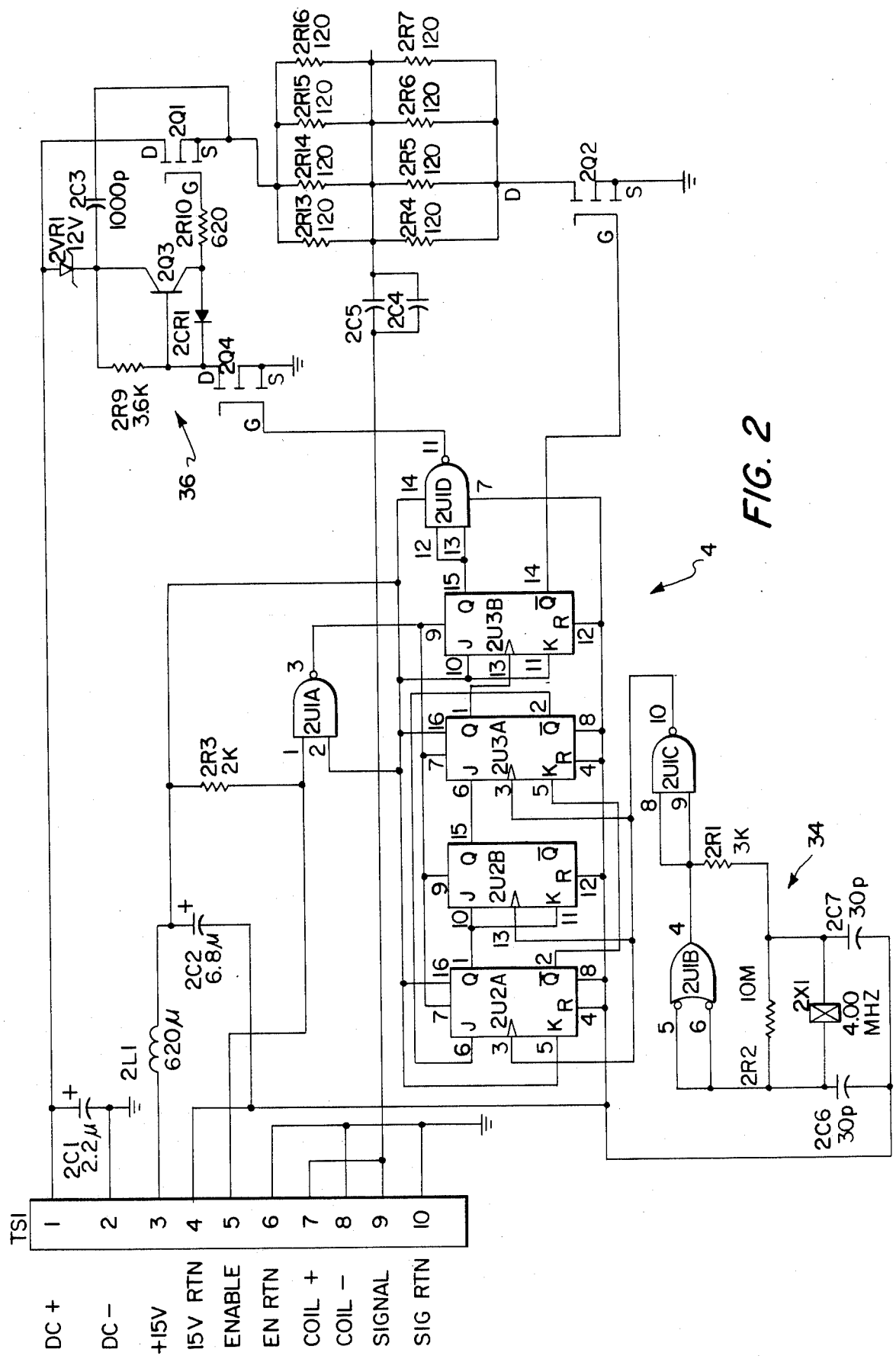

A schematic diagram of the exciter 4 is shown in FIG. 2. The exciter consists of a crystal controlled oscillator 34 formed by gate $2U_1B$ and crystal $2X_1$. In this example the crystal frequency is 4 MHz. The crystal oscillator output is buffered by $2U_1C$ and then divided in frequency by 5 using flip flops $2U_2A$, $2U_2B$, $2U_3A$. The output of $2U_3A$, which is now at 800 KH, is divided in frequency by another factor of 2 in flip flop $2U_3B$ to create a square wave output at 400 KH$_z$. This square wave output then drives a high power switch driver 36 which in turn will drive the coil which is connected to terminals 7 and 8 of connection TSI. The function of gate $2U_1A$ in this circuit is to allow the exciter to be remotely enabled and disabled via the enable input line from terminal TSI-5.

The high power switch driver 36 is formed by VMOS transistors $2Q_1$ and $2Q_2$. $2Q_2$ is switched on by a positive going signal from pin 14 of $2U_3B$. This turns $2Q_2$ on with a low resistance to ground. When the output pin 14 is at a low logic level, $2Q_2$ is turned fully off. $2Q_1$ performs the same function being turned on between a positive DC voltage and off in a high impedance state. Transistors $2Q_3$ and $2Q_4$ perform a voltage translation required to take the output of 2UlD, pin 11, and convert it to the required voltage levels to drive the gate of $2Q_1$. In operation transistor $2Q_2$ is on when transistor $2Q_1$ is off and visa versa. This timing of $2Q_1$ and $2Q_2$ sets up an alternating voltage which is impressed upon the coil via terminals TSI-7 and TSI-8 though capacitors $2C_4$ and $2C_5$. Resistors $2R_4$ through $2R_7$ and $2R_{13}$ through $2R_{16}$ serve to reduce the dissipation of $2Q_1$ and $2Q_2$ during the switching transitions and also define the Q of the circuit formed by $2C_4$ and $2C_5$ and the coil. The voltage across the coil is much greater than the DC voltage at the drain of $2Q_1$. This is due to the resonance of $2C_4$ and $2C_5$ with the coil inductance, at the excitation frequency, in this case 400 KHz. The connections to and from exciter 4 are generally as indicated by the legends. TP 1 and TP 2 are test points. Enable connections TSI-5 and TSI-6 need not be used. They do, however, provide for remote control of the exciter. Open circuits, at these points, enable the exciter. TSI-9 and TSI-10 connect to the signal conditioner.

Signal Conditioner 6

Figure 3:
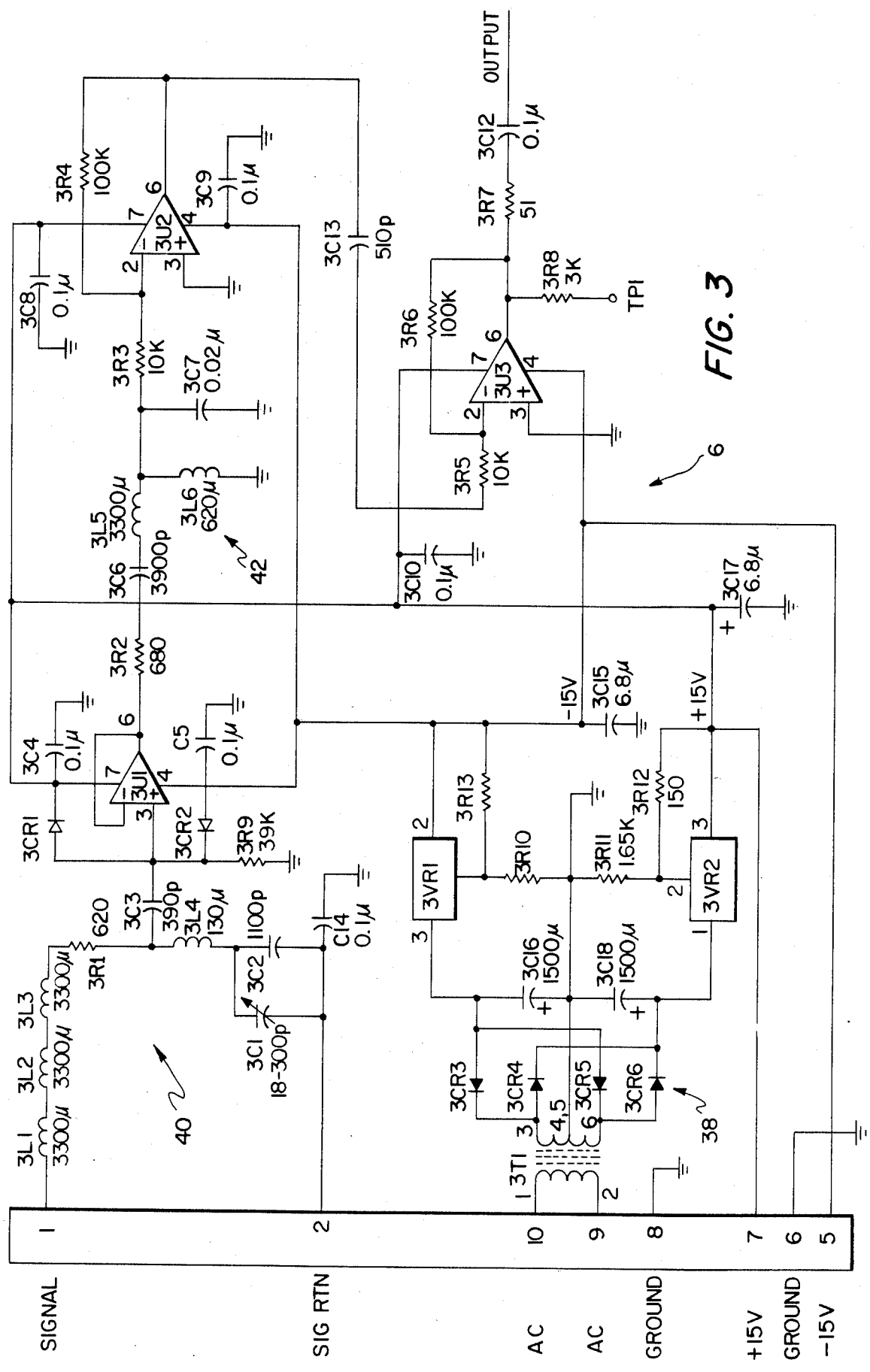
Figure 6:
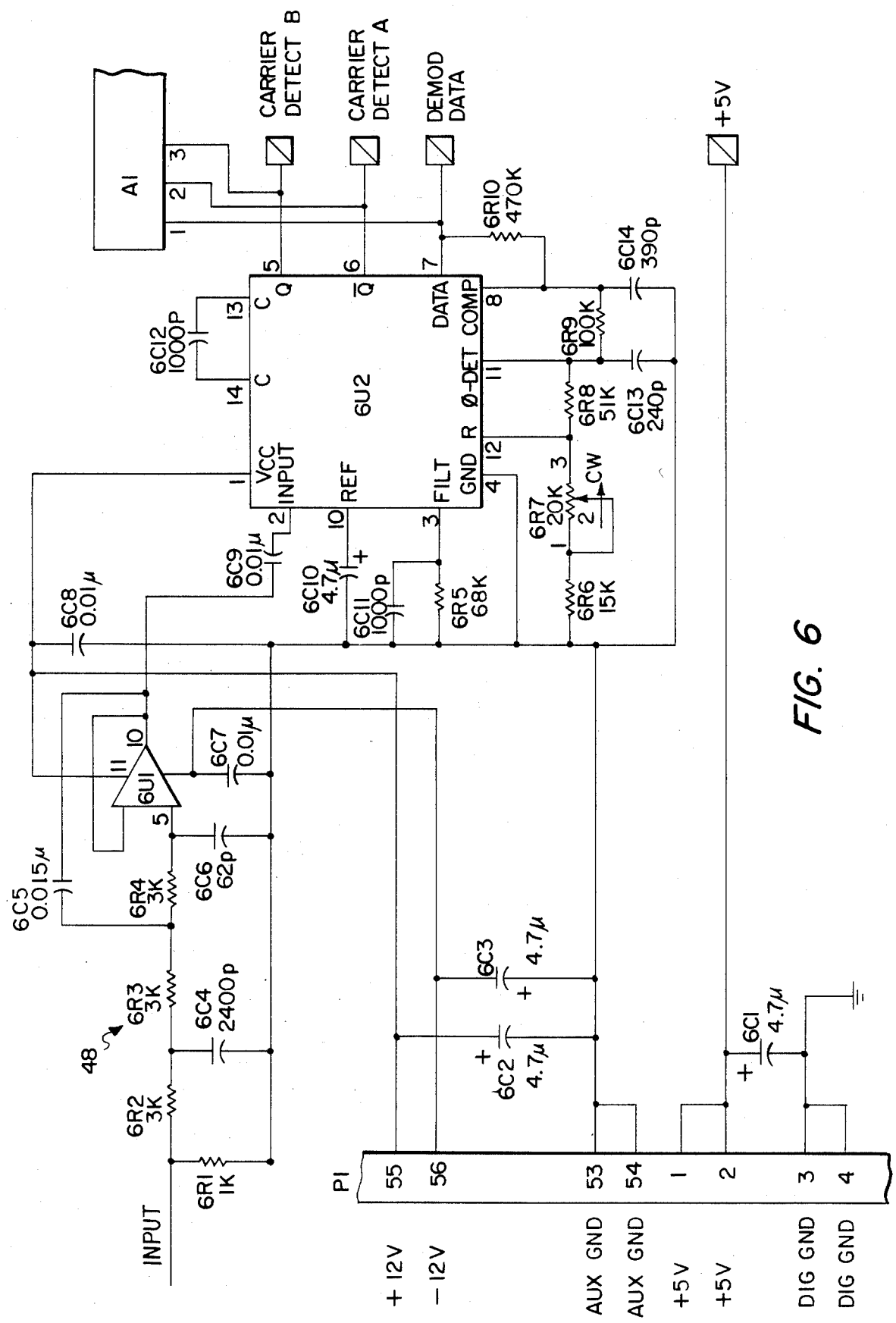

The signal conditioner 6 is shown in FIG. 3 and consists of a conventional power supply 38 formed by transformer $3T_1$, diodes $3CR_3$ through $3CR_6$, capacitors $3C_{15}$ through $C_{18}$ and voltage regulators $3VR_1$ and $3VR_2$. This power supply provides a positive 15 volt and negative 15 volt DC output to power the signal conditioning circuit. The signal conditioning circuit consists of a bandpass filter 40 tuned to the frequencies used by the PIT 18. The bandpass filter 40 consists of inductances $3L_1$, $3L_2$, $3L_3$ and capacitors $3C_1$ and $3C_2$. In this case the PIT frequency is shifted between 40 and 50 kilohertz. Resistor $3R_1$ sets the bandwidth of the filter at 10 kilohertz. In addition $3L_1$ through $3L_3$ appear as a high impedance to the excitation signal of 400 kilohertz; and the series combination of $3L_4$ and $3C_1$ and $3C_2$ serve as a very low impedance to the 400 kilohertz excitation signal, passing it to ground. The identification signal from the PIT 18 is supplied at the SIGNAL and SIG RTN terminals. It is supplied to amplifier $3U_1$, which is a unity gain amplifier which acts as a buffer to drive a bandpass filter 42 formed by $3C_6$, $3L_5$, $3L_6$ and $3C_7$ passing signals between 40 and 50 kilohertz. The output of filter 42 is amplified in $3U_2$ and $3U_3$ to create the filtered amplified output of the signal conditioner circuit, as indicated. The connections for the signal conditioner are generally as indicated in that "SIGNAL" and "SIGRTN" connect to the similarly marked exciter connections TSI-9 and TSI-10, respectively (FIG. 2), "AC-10" and "AC-9" are connections to a power line, 110 volts, 60 HZ, "+15 v" is a positive voltage output and connects to TSI-3 of exciter 4, and "GROUND" 6 is a return for the supply voltages and connects to exciter TSI-4. The "−15 v" connection 5 is not presently used. TPI is a test point. The output of the conditioning circuit 6 is the input to the demodulator circuit (FIG. 6).

Passive Integrated Transponder

Figure 4:
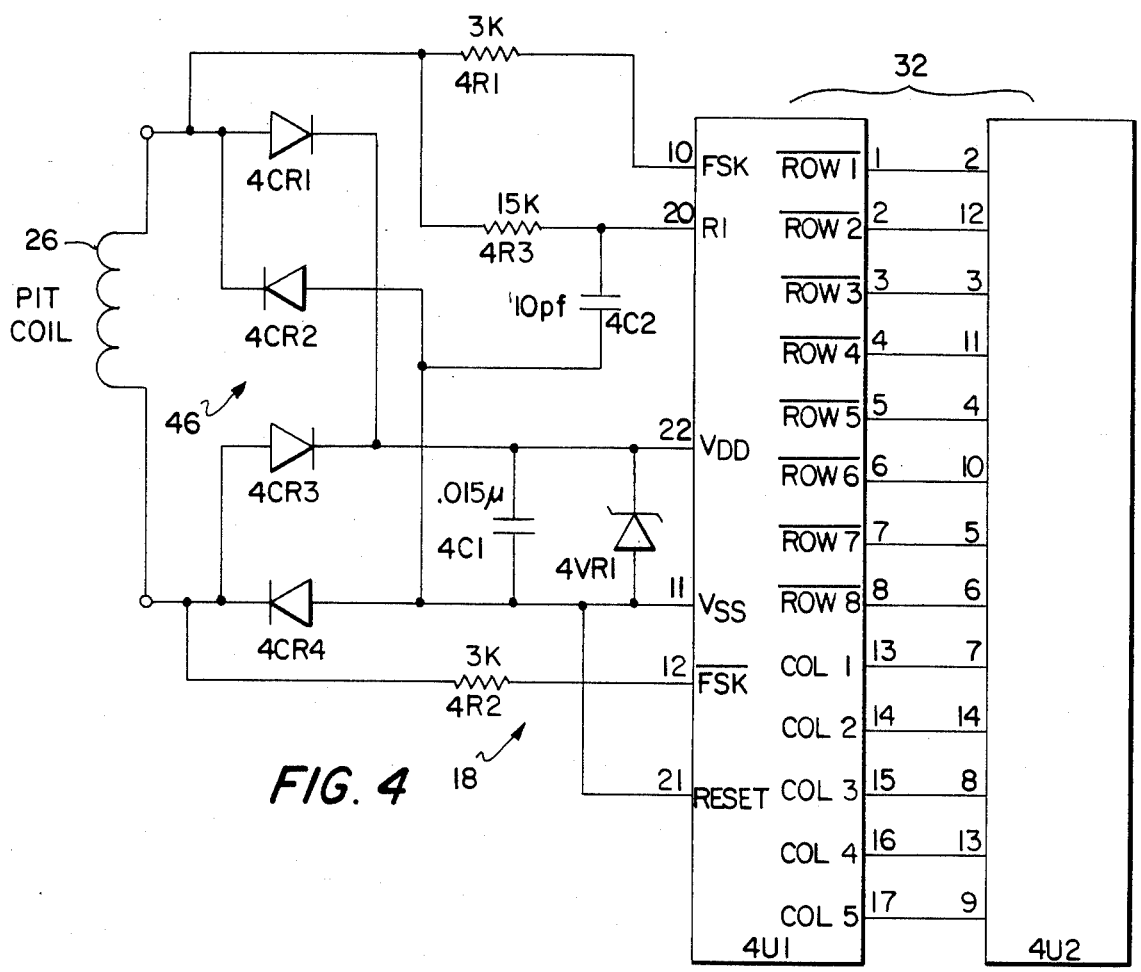

The PIT, FIG. 4, consists of an inductance winding 26, a full-wave rectifier bridge 46, programmable matrix array 4U2 and the control logic 4U1 necessary to provide a frequency shift keyed modulated waveform serially encoded according to the data programmed into the matrix 4U2. The circuit is powered by an alternating current excitation signal resulting from the mutual inductance between the interrogator coil 14 and the PIT winding 26. This is converted to a DC voltage by the full-wave rectifier bridge formed by $4CR_1$ $4CR_2$, $4CR_3$ and $4CR_4$ and the ripple filtering capacitor $4C_1$. This filtered DC level provides the power to the control logic circuits. The zener diode $4VR1$ protects the circuit from excessive DC voltage. The control logic 4U1 provides the signals to scan the matrix array 4U2, convert the data to serial format and insert synchronization information, and generate an FSK modulated output. The array 4U2 of FIG. 4 is a fusible link diode matrix model HM-0186 manufactured by Harris Semiconductor, into which the ID data characterizing the particular PIT transponder is programmed prior to incorporation of 4U2 into the circuit. The array is scanned at a rate determined by the AC excitation signal which is low pass filtered by $4R_3$ and $4C_2$ and then injected into the circuit. Within $4U_1$ (as detailed below in FIG. 7) the clock signal is divided in frequency by 100 and then further divided by eight and decoded to provide eight row select outputs to scan the array 4U2. A divide by six counter with associated gating multiplexes the five column outputs of the array into a serial format. Synchronization information is inserted during one phase of the divide by six operation. The resulting serial composite waveform controls a variable modulus counter (divide by 4/divide by 5) which is clocked at a rate set derived from the excitation signal to produce an FSK modulated waveform. This waveform is divided by 2 and connected back to the AC excitation input via open drain complementary drivers and current limiting resistors $4R_1$ and $4R_2$.

Figure 7A:
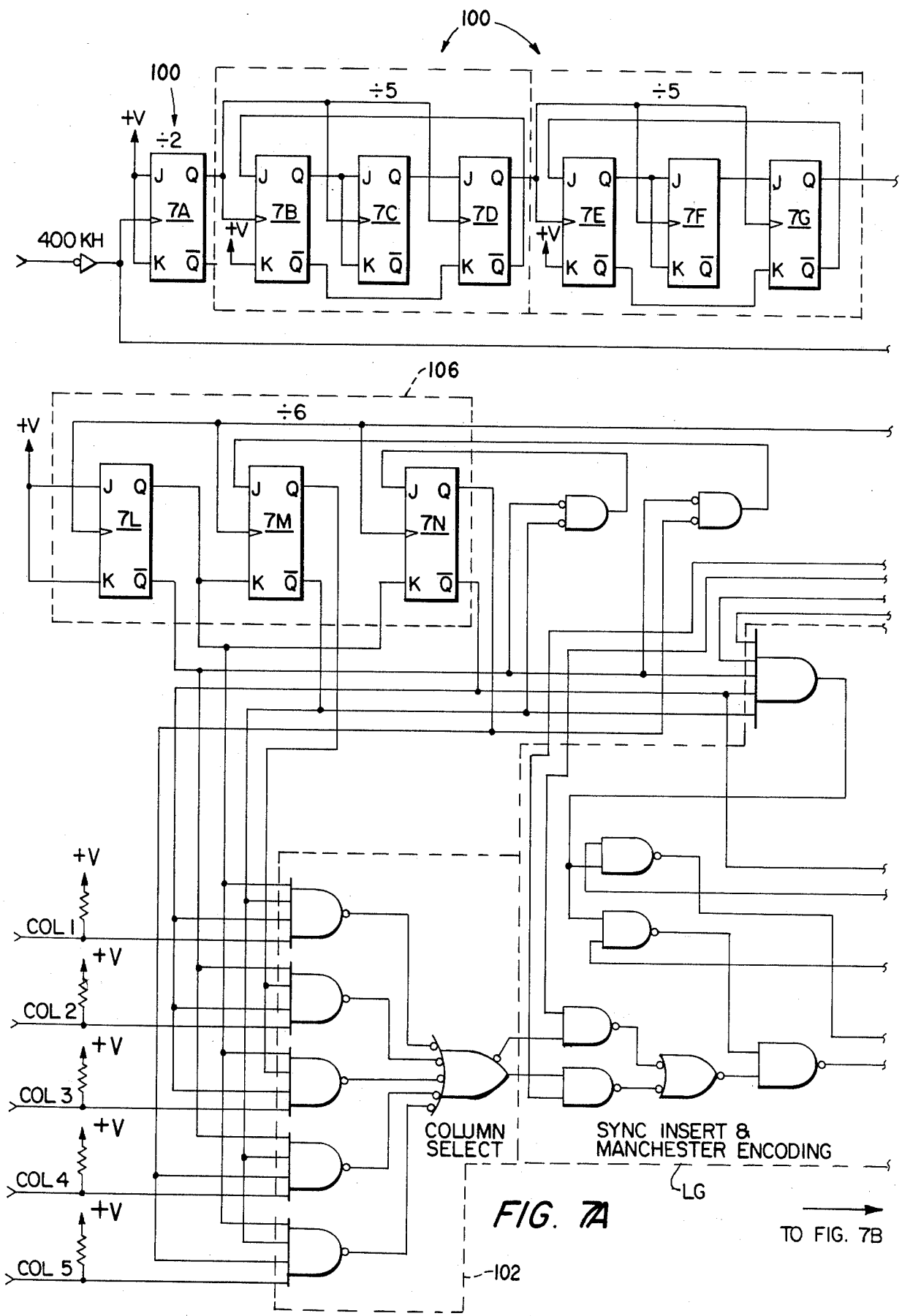
Figure 7B:
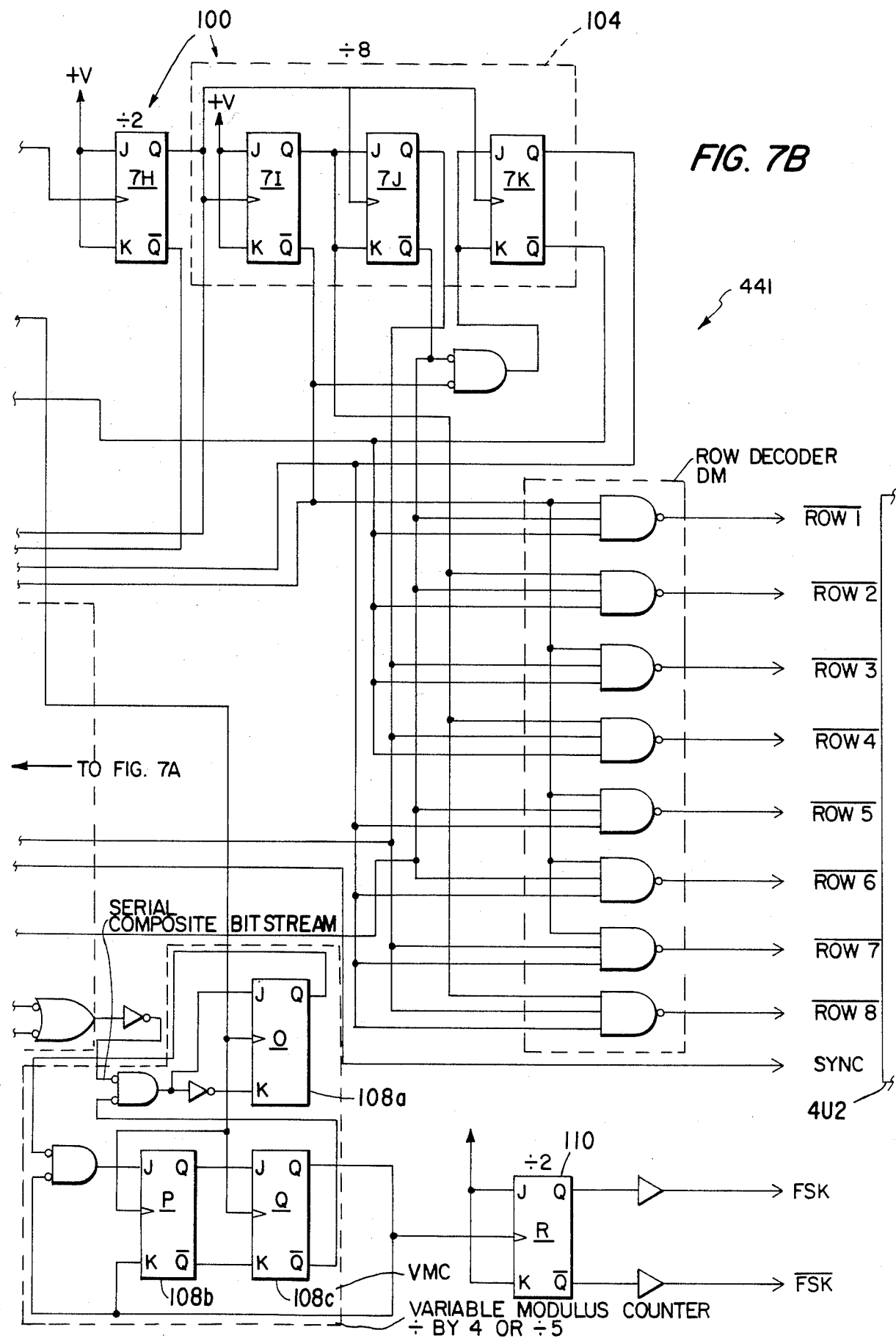

FIGS. 7A and 7B detail the circuit of the PIT. The incoming 400 KHz clock signal is fed through a series 100 of flip flop units, being first divided by two, then by five, again by five, again by two and finally again by eight at 104. The output of this series of flip flops, then at 500 hz, is used to generate eight row strobe signals via NAND gates DM to scan the array 4U2 at connections $\overline{ROW\ 1}$-$\overline{ROW\ 8}$. The five column outputs of array 4U2 are connected to the input COL1-COL5 of a column select gate array 102. While these inputs are shown as being connected to positive voltage supply +V by 100 k resistors, in actual practice the actual devices are FETs; the net result being the same as if resistors were used to bias the incoming circuits to the column select gates.

Reverting momentarily to the NAND gates DM, the outputs of the divide by 8 counter 104 are decoded by eight, three input NAND gates DM to generate the eight row strobes. These row strobes connect to the row inputs of the diode matrix 4U2. During the operation the row strobes are sequentially set to a "low" output. With a 400 KHz clock input each row output is low for 250 milliseconds so that it takes 2 milliseconds for all the row inputs to sequence through the low state. The process is repeated every 2 milliseconds during interrogation.

The COL1-COL5 signals and the outputs of a further divide by six counter 106 provide inputs to five, four-input NAND gates of the column select matrix 102. A given column input is enabled for the time it takes to strobe all eight row outputs (2 milliseconds in the present case). Then the next column is enabled and so on. When the counter 106 is in the 0-0-0 state, no column inputs are enabled, providing a 2 ms "slot" in which the sync word is inserted.

An array LG of logic gates is used to control the insertion of a sync word in the data stream. This logic also applies a Manchester encoding techniques to the data stream. The result is a serial composite signal including sync and data information which is fed to the variable modulus counter VMC as a composite stream. The composite stream controls the modulus (divide ratio) of a variable modulus counter. The variable modulus counter comprising flip flops 108a, 108b, 108c is clocked by the input clock (400 KHZ). The output of this counter is either 80 KHZ or 100 KHZ depending on the data value. This counter drives a divide-by-2 (flip-flop 110) which results in output frequencies of 40 KHZ or 50 KHZ varying as a function of the data stored in the array 4U2.

The output drivers of the divide by two counter 110 are open-drain transistors which are connected through resistors to the transponder coil (PIT coil 26). Thus, when a driver is "on" it "sinks" current from the coil. Since the drivers are driven out of phase, yielding signals FSK, FSK and are connected to opposite sides of the coil, they create an alternating current at the coil with a frequency of 40 KHz or 50 KHz.

Figure 5:
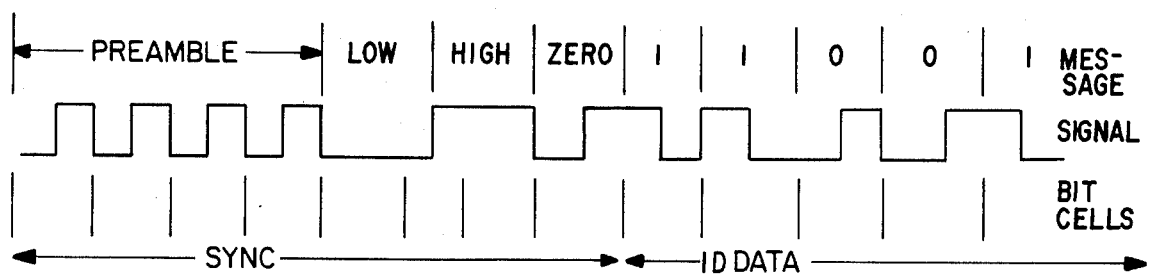
Figure 5:
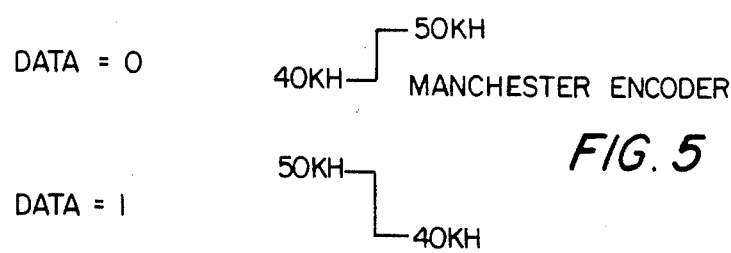

An exemplary representation of the serial digital data stream which controls the variable modulus counter is shown in FIG. 5. Reading down, FIG. 5 shows the message, that is, the data transmitted, the signal frequency, the spacing of the bit periods, the distinction between the sync or preamble portions of the signal and the data, and the Manchester encoding scheme used. The data stream consists of a total of 48 bit periods. Data is encoded using the Manchester encoding technique commonly employed in serial data transmissions. In the Manchester technique, data values are represented by transitions from a low to high level or high to low level in the middle of the bit period. In the present representation, a logical zero data bit is represented by a low to high transition in the middle of the bit period and a logical one data bit is represented by a transition from high to low in the middle of the bit period. Synchronization ("sync") information is contained in the first 8 bit periods of the data stream. The sync consists of 4 bit periods of preamble information followed by a constant low level for one and a half bit periods, a constant high level for one and a half bit periods and a zero data bit. The eight sync bit periods are followed by 40 bit periods containing the actual ID data. Exemplary data corresponding to "11001 . . . " is shown. The circuit runs continuously during interrogation such that an endless stream of sync followed by data appears.

Demodulation

The demodulation circuit is shown in FIG. 6. Its input is the output of the signal conditioner (FIG. 3). The demodulation circuit shown in, FIG. 6 includes a low pass filter 48 which functions to further reduce the undesired excitation signal frequencies, followed by a tone decoder 6U2 which tracks the excursions of the frequency shift keyed waveform output from the passive integrated transponder. 6U2 is an FSK demodulator manufactured by EXAR Corporation, model XR-2211. The low pass filter is a three pole unity gain design formed by $6U_1$ in combination with $6R_2$ through $6R_4$ and $6C_4$ through $6C_6$. The output of this low pass filter drives the tone decoder 6U2. The tone decoder consists of a voltage controlled oscillator and a phase detector arranged such that the phase detector output provides a control voltage to the voltage controlled oscillator to track the frequency excursions of the input signal. The free-running frequency of the voltage controlled oscillator is set by $6C_{12}$ and $6R_6$ plus $6R_7$. The phase detector output, signal $\phi$DET, at pin 11, provides a control voltage to the oscillator through $6R_8$ so that the oscillator tracks the frequency of the incoming signal and is phase-locked to it. The output $\phi$DET of the phase detector is also filtered by $6C_{13}$, $6R_9$ and $6C_{14}$ and input at COMP to a comparator circuit. The comparator threshold is in the center of the tracking range between the two frequencies. Therefore, as the frequency shifts between its lower value and its upper value, the DATA output signal of the comparator at pin 7 of 6U2 alternates between two logic levels. Thus, 6U2 demodulates the FSK waveform presented as INPUT at pin 2 into a digital waveform which is OUTPUT at pin 7. This digital waveform may be processed by the microcomputer using the sync and timing information within the waveform to actually decode the final identification number and use it as desired.

Tone decoder 6U2 provides output signals as follows:

"Carrier Detect A" indicates that a carrier signal from the transponder 18 is present.

"Carrier Detect B" is the same as "Carrier Detect A", but with opposite logic sense.

"Demod Data" supplies the demodulated identification signal.

I claim:

1. An object identification system, comprising:
an interrogator comprising means for sending a continuous interrogation signal and means for detecting a responsive identification signal, and
a transponder comprising means for detecting said interrogation signal and for transmitting an identification signal in response to said detection,
wherein said identification signal extends over a plurality of bit cells of equal length in time, and comprises a preamble portion having a specified number of bit cells and an identification portion having a specified number of bit cells, and a further encoded portion having a specified number of bit cells having a predetermined signal content interposed between said preamble portion and said identification portion; and
wherein said preamble and identification portions of said identification signal are transmitted according to a first format in which a signal transmission parameter is varied between first and second values during each of said bit cells, and wherein said further encoded portion is transmitted according to a second format in which said identification signal is transmitted without variation in said transmission parameter for a period at least equal to one bit cell.

2. The system of claim 1 wherein said interrogator and said transponder are inductively coupled, such that said transponder is powered by said interrogation signal transmitted by said interrogator.

3. The system of claim 2 wherein said interrogation signal is an RF signal of specified frequency.

4. The system of claim 3 wherein said bit cells are synchronized to said RF interrogation signal.

5. The system of claim 4 wherein the frequency of said bit cells is an integer factor of the frequency of said RF interrogation signal.

6. The system of any one of claims 1-5 wherein said identification signal is a frequency shift keyed signal.

7. The system of claim 6 wherein said frequency shift keyed identification signal is varied between first and second frequencies substantially at the center of said bit cells, the direction of said variation in a given bit cell encoding a data value to be sent during said bit cell.

8. The system of claim 5 wherein the frequency of said bit cells is derived from the RF interrogation signal by successive integer division thereof.

9. The system of claim 8 wherein said integer division is performed by cascaded flip-flop circuit elements.

10. The system of any of of claims 1-5 wherein said identification signal comprises a sequence of digital bits, said sequence being stored in solid-state memory means.

11. The system of claim 10 wherein said solid-state memory means is a diode matrix.

12. The system of claim 1, wherein in said first format said transmission parameter is varied in the center of each bit cell.

13. The system of claim 1, wherein said transmission parameter is frequency.

14. The system of claim 13, wherein in the first format the frequency of the identification signal is varied from a relatively low to a relatively high frequency during a bit cell to transmit a data zero and from a relatively high frequency to a relatively low frequency to transmit a data one.

15. A transponder for use in an object identification system of the type comprising an interrogator comprising means for sending a continuous interrogation signal and means for detecting a responsive identification signal,
said transponder comprising means for detecting said interrogation signal and for transmitting an identification signal in response to said detection,
wherein said identification signal extends over a plurality of bit cells of equal length in time, and comprises a preamble portion having a specified number of bit cells, a data portion hving a specified number of bit cells, and a further portion having a specified number of bit cells each having a predetermined signal content interposed between said preamble portion and said data portion, and
wherein said preamble and data portions are transmitted according to a first format in which a signal transmission parameter is varied between first and second values during each of said bit cells, and said further portion is transmitted according to a second format in which the identification signal is transmitted without variation in said transmission parameter for a period at least equal to one bit cell.

16. The transponder of claim 15 wherein said transponder includes means for inductively coupling to said interrogator, such that said transponder is powered by said interrogation signal transmitted by said interrogator.

17. The transponder of claim 16 wherein said interrogation signal is an RF signal of specified frequency.

18. The transponder of claim 17 wherein said bit cells are synchronized to said RF interrogation signal.

19. The transponder of claim 18 wherein the frequency of said bit cells is an integer factor of the frequency of said RF interrogation signal.

20. The transponder of any one of claims 15-19 wherein said identification signal is a frequency shift keyed signal.

21. The transponder of claim 20 wherein said frequency shift keyed identification signal is varied between first and second frequencies substantially at the center of said bit cells, the direction of said variation in a given bit cell encoding a data value to be sent during said bit cell.

22. The transponder of claim 19 wherein the frequency of said bit cells is derived from the RF interrogation signal by successive integer division thereof.

23. The transponder of claim 22 wherein said integer division is performed by cascaded flip-flop circuit elements.

24. The transponder of any one of claims 15–19 wherein said identification signal comprises a sequence of digital bits, said sequence being stored in solid-state memory means.

25. The transponder of claim 15, wherein in said first format said transmission parameter is varied in the center of each bit cell.

26. The transponder of claim 15, wherein said transmission parameter is frequency.

27. The transponder of claim 26, wherein the frequency of the identification signal is varied from a relatively low to a relatively high frequency during a bit cell to transmit a data zero, and from a relatively high frequency to a relatively low frequency to transmit a data one.

28. Method for identifying objects, comprising the steps of:
   emitting a continuous interrogation signal from an interrogator;
   detecting said interrogation signal at a transponder in the vicinity of said interrogator;
   transmitting an encoded identification signal from said transponder to said interrogator; and
   receiving and decoding said encoded identification signal at said interrogator;
   wherein said identification signal includes a first preamble portion, a last identification portion, and a further portion interposed between said first and last portions,
   wherein said preamble and identification portions each have a number of equally-spaced bit cells, and said further portion comprises a number of bit cells each of predetermined signal content and
   wherein said preamble and identification portions are transmitted according to a first format in which a signal transmission parameter is varied between first and second values during each of said bit cells, and said further portion is transmitted according to a second format in which said transmission parameter is not varied for a period at least equal to one bit cell.

29. The method of claim 28 wherein said step of receiving the interrogation signal includes the step of receiving power from the interrogation signal.

30. The method of claim 28 wherein said step of transmitting the encoded identification signal includes the step of generating a clock signal derived from the interrogation signal and synchronizing the portions of the identification signal thereto.

31. The method of claim 30 wherein said clock signal is derived from said interrogation signal by integer division thereof in flip-flop circuit elements.

32. The method of claim 28 wherein said identification signal is a frequency-shift-keyed signal according to which the data transmitted as part of said identification signal is encoded by variation of the frequency of transmission.

33. The method of claim 32 wherein said variation is between first and second frequencies, each being integral factors of the frequency of the interrogation signal.

34. The method of claim 33 wherein said identification signal is divided into bit cells synchronized to said identification signal.

35. The method of claim 34 wherein said bit cells are defined by division of said interrogation signal.

36. The method of claim 35 wherein said variation of the frequency of the signal occurs substantially at the center of each bit cell, and its direction is responsive to the data value to be encoded during the bit cell.

37. The system of claim 28, wherein in said first format said transmission parameter is varied in the center of each bit cell.

38. The method of claim 28, wherein said transmission parameter is frequency.

39. The system of claim 38, wherein the frequency of the identification signal is varied from a relatively low to a relatively high frequency during a bit cell to transmit a data zero and from a relatively high frequency to a relatively low frequency to transmit a data one.

* * * * *